May 7, 1935.  T. M. RECTOR  2,000,646

METHOD OF PREPARING FOOD PRODUCTS

Filed Jan. 25, 1932  9 Sheets-Sheet 1

Fig. 1.

Inventor
Thomas M. Rector.
By
Cameron, Kerkam + Sutton.
Attorneys

May 7, 1935.  T. M. RECTOR  2,000,646
METHOD OF PREPARING FOOD PRODUCTS
Filed Jan. 25, 1932  9 Sheets-Sheet 3

Inventor
Thomas M. Rector.
By Cameron, Kerkam & Sutton.
Attorneys

Fig. 3.

May 7, 1935.  T. M. RECTOR  2,000,646
METHOD OF PREPARING FOOD PRODUCTS
Filed Jan. 25, 1932   9 Sheets-Sheet 8

Inventor
Thomas M. Rector.
By Cameron, Kerkam & Sutton.
Attorneys

Patented May 7, 1935

2,000,646

UNITED STATES PATENT OFFICE 2,000,646

METHOD OF PREPARING FOOD PRODUCTS

Thomas M. Rector, Rutherford, N. J., assignor to The Best Foods, Inc., New York, N. Y., a corporation of Delaware Application January 25, 1932, Serial No. 588,753

19 Claims. (Cl. 99—11)

The present invention relates to a method of manufacturing emulsified food products and is particularly adapted for the preparation of relatively thick stable emulsions such as the commercially known salad dressing or mayonnaise, although not limited to such use. This application is a continuation-in-part of the prior applications of Thomas M. Rector Serial No. 513,236 and Serial No. 556,438.

Mayonnaise, as now prepared and sold on the market, comprises an emulsion usually containing a suitable vegetable oil, such as cottonseed oil, egg yolk, vinegar, spices, sugar and salt, etc. In starting the emulsion, the egg yolk, spices, sugar and salt, etc., together with a small amount of emulsion from a previous operation and usually some vinegar, are placed in a mixing bowl provided with a suitable stirring or beating device, and oil and vinegar slowly added while the contents of the bowl are rapidly beaten. The amounts of the ingredients, particularly oil and vinegar, are carefully measured and the rate at which the latter are added is carefully regulated by the operator. The emulsion gradually builds up until a very thick stable emulsion is obtained, which may, if desired, be subsequently diluted with small quantities of vinegar or the like. The bowl is then emptied, cleaned, and a second batch started.

This procedure has a number of disadvantages. Preparation of the product in small batches limits the amount which an operator can produce in a given period. Production costs therefore are high. Only the most skilled operators can be used to attend to the careful measurement and addition of the ingredients, yet some variation in the quality of the product is bound to occur because no two batches are likely to be prepared in exactly the same way by different individuals. Furthermore, though many attempts have been made to improve it, the initial consistency of the product is less than that necessary for best results.

One of the objects of the present invention is to provide a continuous method of emulsification wherein a continuous supply of starting materials is agitated or beaten and continuously emulsified and a steady, uninterrupted supply of the finished emulsion is produced.

Another object is to provide a novel method of making mayonnaise which greatly improves the initial consistency and also produces a more perfect emulsion and a more uniform product.

A further object is to provide a novel method wherein the materials to be mixed or emulsified are continuously fed to and progressed through a beating zone and a continuous supply of the finished product is delivered at the end of such zone.

Another object is to provide a novel method wherein materials to be mixed or emulsified are continuously fed to and progressed through a beating zone in which said starting materials are first emulsified, then beaten or whipped, and then diluted and further beaten or whipped to provide a continuous supply of finished emulsion.

A still further object is to provide a novel method of producing a thick stable emulsion, such as a salad dressing, wherein the starting materials are continuously fed to and progressed through a zone of beating or agitation while additional materials are continuously added to build up the emulsion to the desired consistency.

It has been found that the addition of vinegar to egg yolk before the same is mixed with the oil, or when added during the mixing with the oil, has a very deleterious effect on the texture of the emulsion and the consistency of the product. The presence of vinegar or other acid at the start of emulsification causes an undesirable increase in the viscosity of the egg yolk which renders the egg phase less elastic and less mobile. This decrease in elasticity prevents the emulsifying agent of the egg yolk from spreading over a maximum surface of oil without breaking and sub-dividing the oil into droplets to a degree that is possible by a method such as is herein disclosed.

According to the present invention, the egg yolk is first diluted with a medium which will not destroy the elasticity or mobility of the emulsifying agent of the egg yolk. The spices used for flavoring may be added to this diluted egg yolk at the start if desired, or may later be added during emulsification. Next, oil is gradually added to the egg yolk and the mixture continuously whipped to form an emulsion. After the emulsion has been formed and is in a fixed state, the acid preserving and flavoring ingredient is added, which at this stage has little if any effect on the emulsion.

According to the present invention also, a method is provided which is continuous and substantially automatic in operation as distinguished from the individually controlled batch method above described. In the new method, a zone or region of beating or agitation is established and provided with suitable stirring or beating means, and the ingredients to be emulsified are progressed through such zone while the emulsion is being formed. The starting ingredients are fed continuously to the zone at one end and additional ingredients are added to the starting ingredients as the latter progress through the zone of emulsification. It will be understood that this operation is continuous, a part of the starting ingredients being fed continuously to one end of the zone, and additional ingredients being continuously added as the starting ingredients travel through the zone, a continuous supply of the finished product being delivered at the other end of the zone. Moreover, since the desired proportions of the various ingredients are known and since the flow of all of the ingredients is continuous, suitable feed means are employed to provide a continuous feed for the ingredients at the predetermined rates, whereby the operation is made substantially automatic.

In the manufacture of salad dressing, according to the present invention, it is preferable to mix the starting ingredients, such as egg yolk, spices, salt and sugar, and preferably a non-acid diluent, in a suitable preliminary mixer. By doing so the number of separate feeds required can be reduced. These materials are then fed continuously to the beating zone in any suitable manner at the proper predetermined rate, together with a continuous regulated supply of oil. In the beating zone, this mixture of starting materials is caused to travel slowly from the inlet or supply end to the discharge end of the zone. During this travel, the starting materials are first beaten and emulsified in the initial portion of the beating zone and thereafter for a suitable portion of the progress of the materials through the zone, they are thoroughly beaten or whipped. Toward the end of the beating zone, the emulsion may be diluted with vinegar or the like, if desired, and thereafter further beaten or whipped. The emulsion is thus built up along the beating zone and a thick stable emulsion of the desired consistency is delivered at the end of such zone. The dilution with vinegar may, however, if desired, be performed after the emulsion leaves the beating zone in a mixer of any suitable type.

The invention will be better understood by reference to the accompanying drawings showing one form of mixing or emulsifying apparatus that is particularly adapted to carry out the method described above, but it is to be expressly understood that said drawings are for purposes of illustrations only and are not to be construed as a definition of the limits of the invention, reference being had to the appended claims for this purpose. In said drawings—

In the preferred embodiment of the invention, as applied to the manufacture of salad dressing in the form of a thick stable emulsion, the beating or agitating zone is defined by a receptacle or container having the general form of a trough along which are positioned at spaced intervals a plurality of suitable beating elements. The starting ingredients are fed to one end of the trough in any suitable manner, as by a regulated gravity feed or a pump having a regulated rate of feed, and these materials may be caused to progress or travel along the trough to the discharge or delivery end thereof in any suitable manner but preferably by causing relative reciprocatory movement of the trough and the beating elements which movement works the materials along the trough. Ingredients to complete the finished product may be added at suitable points along the trough by any suitable means such as a regulated gravity feed or a pump having a regulated rate of feed.

Preferably the treatment of the materials as they progress along the trough comprises three stages. The starting materials, which as above stated may comprise egg yolk, spices, salt and sugar, and preferably a non-acid diluent, are fed to the inlet end of the trough and in the first portion of their travel therethrough are beaten and emulsified, this first portion constituting a zone of initial emulsification. Throughout a second intermediate portion of their travel along the trough, the emulsified materials from the first zone are thoroughly beaten or whipped, the course of travel being controlled in a suitable manner so that all of the materials are directly acted upon by the beaters and are thoroughly mixed and beaten. This second portion thus constitutes a beating or whipping zone. Throughout a third portion of their travel along the trough, the materials are preferably diluted with vinegar and further beaten, the materials leaving this third zone thus constituting a finished product. This third portion therefore constitutes a diluting and beating zone. It will be understood, however, that the apparatus may be adapted to carry out a different series of steps if desired.

The advantages of mixing the egg yolk with a non-acid diluent instead of vinegar have already been referred to above. For example, it has been found that when the egg yolk is diluted with water, or a similar non-acid diluent, before oil is added neither the elasticity nor mobility of the emulsifying agent in the egg yolk is harmfully affected. When oil is gradually added to this diluted egg yolk and the mixture continuously whipped, an emulsion is formed having a much higher initial consistency than the same product made with vinegar as a diluent at the beginning of the process. This is due to the natural elasticity of the egg yolk emulsifier, which has the ability to cover a greater area of oil surface, sub-dividing the oil into smaller droplets and giving a finer texture to the emulsion. After the mixture has been whipped and the emulsion advanced beyond the formative state the vinegar is added, which then has no detrimental effect on the egg yolk or the emulsion, the elasticity having remained unchanged during the entire emulsifying period.

In tests made on mayonnaise emulsion prepared in accordance with the present invention, it was found that the product had an initial consistency of 360 as measured on a standard mobilometer. For comparison it was found that when mayonnaise was made under the same conditions, except that vinegar was used instead of water, the resultant product had an initial consistency of only 210 in the same mobilometer. Further, it was found that there was a very marked decrease in the amount of power required to properly mix the water emulsion as compared with the vinegar emulsion. This marked decrease in power was found to be more than twenty per cent, and is explainable by the fact that the use of water does not increase the viscosity of the egg yolk, whereas vinegar does. It has also been found, when water is used, that a more uniform product may be made for the reason that the elasticity of the emulsifying agent in the egg yolk remains unchanged during the entire emulsifying period, and as the factors remain constant the resultant product will of necessity be uniform.

Referring now to the apparatus shown in the drawings an elongated trough 20 of substantially U-shape cross section cooperates with a suitable beating unit comprising a plurality of beaters 21 to beat the ingredients. Said beaters, which as shown are six in number, may be of any suitable or known type and as shown are mounted on standards 22 at one side of the trough 20 and are driven by electric motors 23 which through suitable gearing cause the beater elements 21 to rotate on their own axes and at the same time to revolve with a planetary motion about an axis. Preferably the paths of movement of beaters 21 extend substantially completely across the trough 20.

Figure 3:
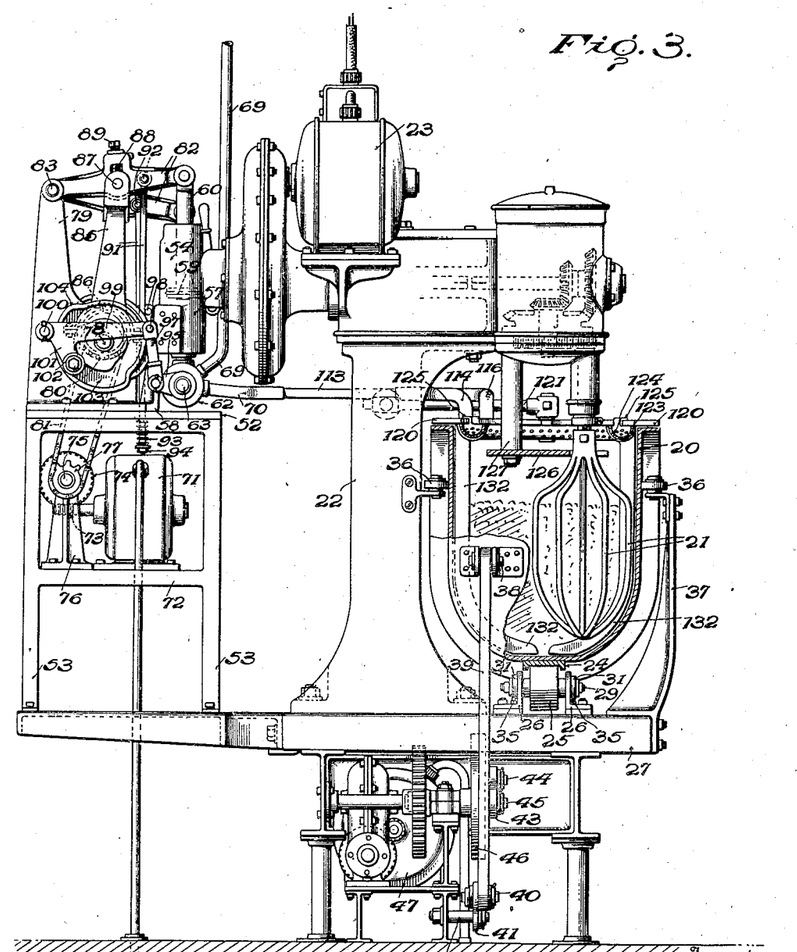
Fig. 3 is an end view of the emulsifying or beating apparatus.
Figure 14:
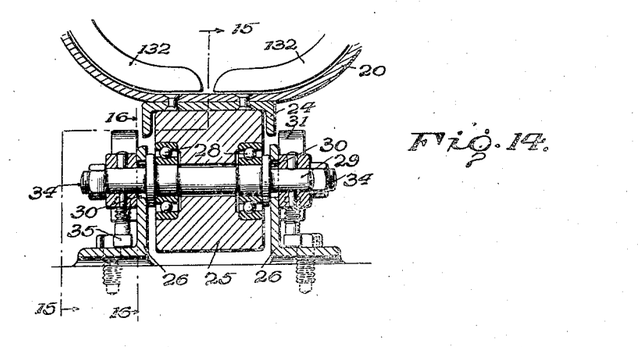
Figs. 14 to 17 inclusive, are detail views of means for movably mounting the receptacle or container, Figs. 15 and 16 being taken respectively on lines 15—15 and 16—16 of Fig. 14.
Figure 15:
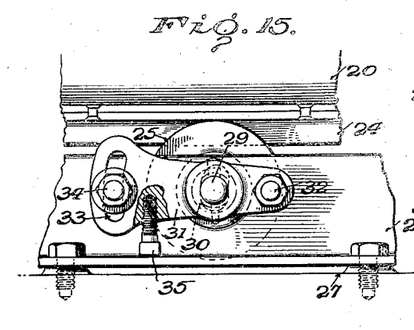
Figure 16:
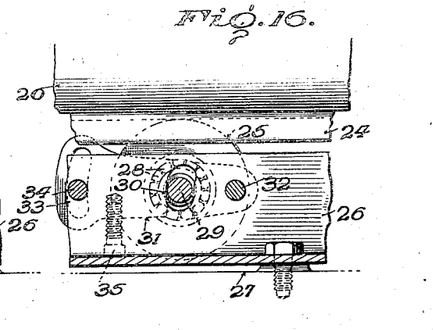
Figure 17:
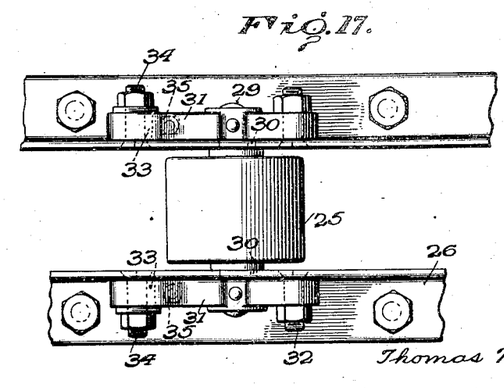

Either the beating unit or the trough may be movable in order to provide for relative reciprocatory movement between the two, and in the form shown, the trough 20 is reciprocated relative to a stationary beating unit, this movement causing the travel of the materials along the trough. To this end the trough, as shown in Figs. 3 and 14, is provided on its bottom with a longitudinally extending inverted channel member 24 whereby the trough is mounted on one or more rollers 25 supported between angle irons 26 or the like on a base 27. Rollers 25 may, if desired, be mounted for vertical adjustment and as shown are mounted by means of ball bearings 28 or the like on axles or spindles 29 which extend outwardly through elongated openings 30 in the angle irons 26. The outer ends of the axles 29 are suitably supported in arms 31, each of which is pivoted at one end at 32 to one of the channels 26 and is provided at its other end with an elongated slot 33 in which engages a bolt and nut 34 suitably secured to one of the channels 26. By loosening nuts 34, a pair of arms 31 may be swung about their pivots 32 to raise or lower one of the axles 29 and its roller 25, and preferably said arms are supported in adjusted position by suitable means such as set screws 35 threaded in said arms 31 and engaging the flanges of channels 26. The trough 20 is also preferably guided in its movement on rollers 25 by suitable means such as guide rollers 36, certain of which may be mounted on the standards 22 and others being carried by brackets 37 secured to the base 27.

Figure 1:
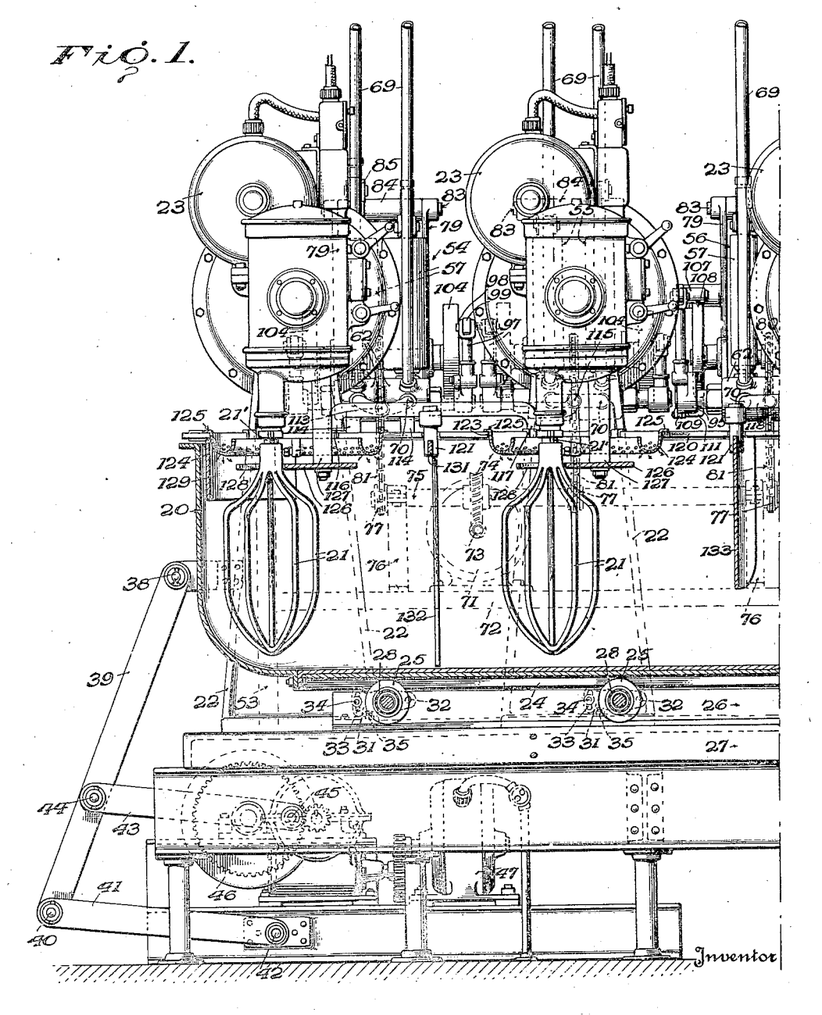
Figs. 1, 1a and 1b constitute a side elevation, partly in section, of the beating or emulsifying apparatus.

The trough 20 may be reciprocated on rollers 25 in any suitable manner, and as shown in Fig. 1, one end of the trough has pivoted thereto at 38 an operating lever 39 that is in turn pivoted at 40 to an arm 41 having a stationary pivot 42. Lever 39 may be rocked to reciprocate the trough 20 by suitable means such as a link 43 pivoted at 44 to the lever 39 and at 45 to a wheel or disk 46 which may be rotated through any suitable gearing from an electric motor 47.

Figure 1A:
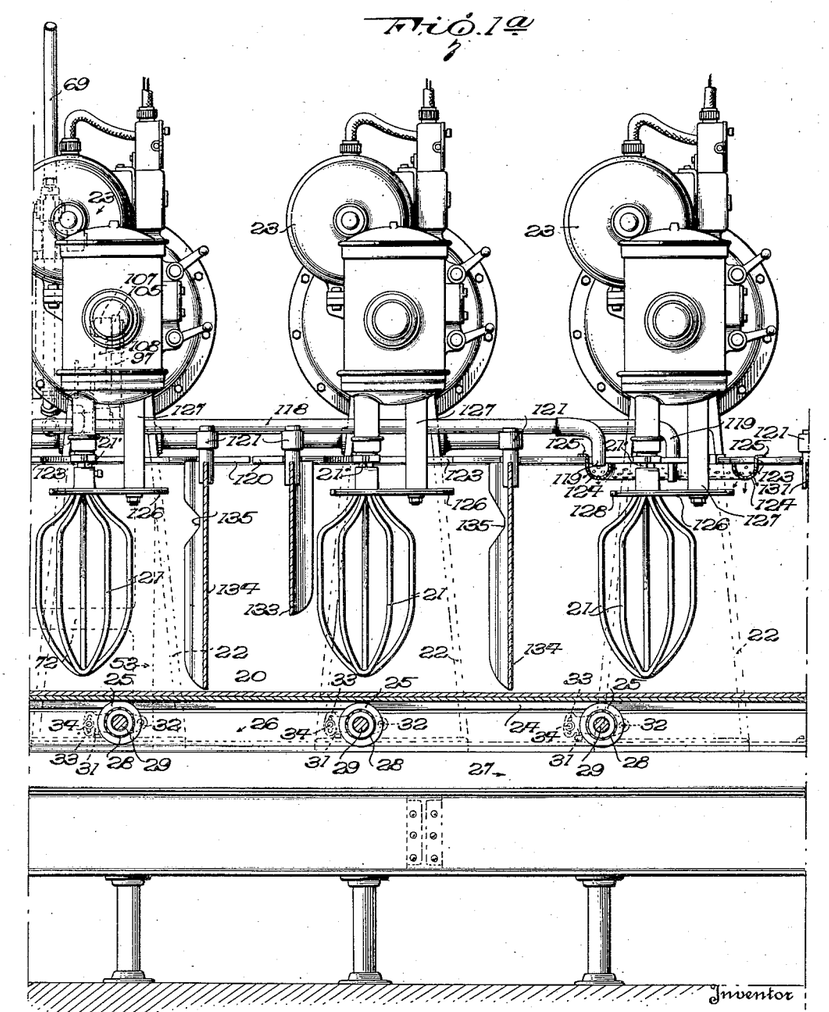
Figures 1B, 7, 8, 18:
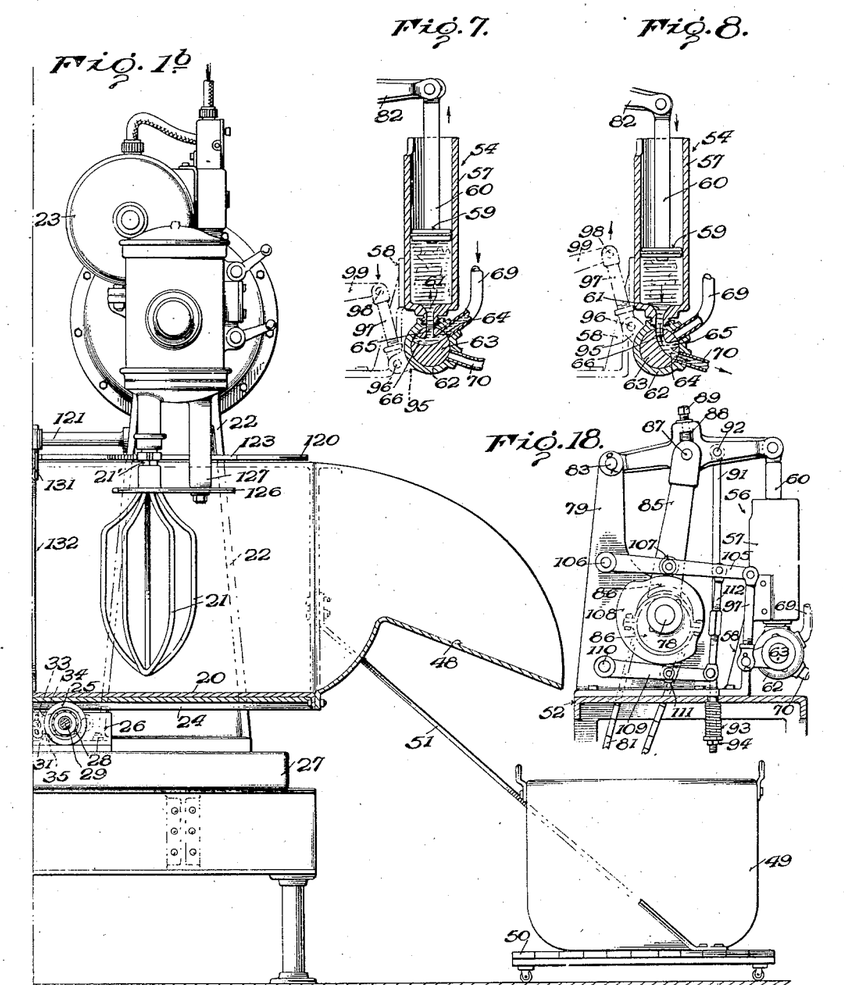
Figs. 7 and 8 are details of pump cylinders for feeding ingredients to the receptacle.
Fig. 18 is a detail view of further pumping or feeding mechanism.

The beaters 21 preferably have a shape that conforms closely to the cross sectional form of the trough 20, as clearly shown in Fig. 3, and as said beaters follow their above described planetary movement and travel across the trough and close to its side while the trough reciprocates, substantially the entire area of the trough is covered by the beaters so that all of the materials therein are acted upon. Moreover, it is found that the reciprocation of the trough with respect to the beaters causes the materials in the trough to progress or travel slowly from the inlet end to the discharge end at which they are discharged by a suitable chute or spout 48 (Fig. 1b). As shown, materials discharged from spout 48 fall into a receptacle 49 on a car 50 which is connected to the moving trough by brackets 51, but it will be understood that any suitable disposition may be made of the discharged emulsion.

During their passage along the trough to the discharge spout, the materials pass successively through the three zones mentioned above. The first zone, or zone of emulsification, includes as shown the first two beaters; the second zone or zone of beating includes the third and fourth beaters; and the third zone, or zone of dilution and final beating, includes the fifth and sixth beaters.

For the manufacture of salad dressing, as explained above, the starting materials including egg yolk, spices, and salt and sugar, diluted with some water to provide the proper flowable consistency, are preliminarily mixed in any suitable manner and fed to the inlet end of the trough. This feed may be either a gravity feed or a pump feed, and in the form shown in the drawings, a suitable pumping apparatus is employed which is capable of being regulated to feed the above mixture to the trough at a predetermined rate. Preferably this pumping apparatus comprises a plurality of pump cylinders having reciprocating plungers or pistons and adapted to discharge into the inlet end of the trough, one cylinder discharging into the trough while another cylinder has its suction stroke whereby a continuous feed is provided. Similar feed arrangements may be provided for supplying regulated quantities of oil to the inlet end of the trough, and of vinegar or the like to the third zone of dilution, the oil and vinegar pumps being preferably driven from the same source of power as the egg pumps and in timed relation therewith.

Figure 13:
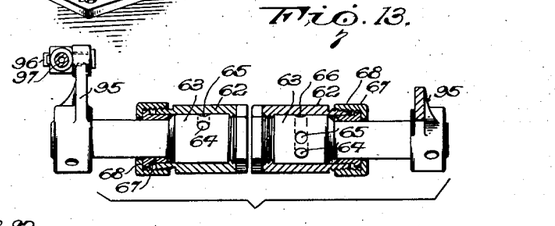

Referring particularly to Figs. 2, 3, 7, 8 and 11 to 13 inclusive, a suitable supporting table 52 is mounted at one side of the trough 20, preferably in back of the standards 22, by suitable legs 53 secured to the base 27. Disposed on the table 52 are a pair of egg pumps 54, a pair of oil pumps 55, and a pair of vinegar pumps 56, these pumps preferably being substantially similar in construction and operation and operated from a common source of power. As shown in Figs. 7 and 8, each pump comprises a vertical pump cylinder 57 supported on the table 52 by means of suitable brackets 58 and having therein a piston 59 and piston rod 60. At the bottom of each cylinder 57 is a single opening 61 which in one direction of movement of piston 59 serves as an inlet opening and in the other direction of movement of piston 59 serves as a discharge opening. To this end a valve casing 62 is secured to the bottom end of the cylinder 57 and houses a rotating valve plug 63 provided with a valve passage having three branches 64, 65 and 66, leakage from each valve casing being prevented in any suitable manner as by means of a gland 67 and nut 68 (Fig. 13). When the piston 59 is on its upstroke or suction stroke, as seen in Fig. 7, communication is established by way of passages 64 and 65 between an inlet pipe 69 and the port 61 so that the cylinder 57 fills up. When the piston 59 is on its downstroke or discharge stroke, as seen in Fig. 8, communication is established by means of passages 64 and 66 between a discharge pipe 70 and port 61 so that the contents of cylinder 57 are discharged.

Figure 11:
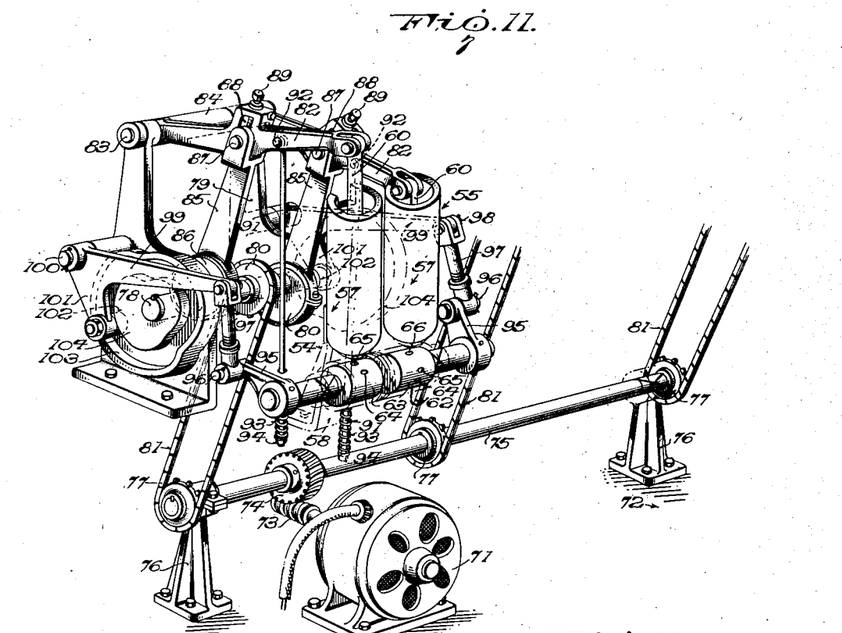
Fig. 11 is a perspective view of suitable pumping or feeding mechanism for the materials.
Figure 12:
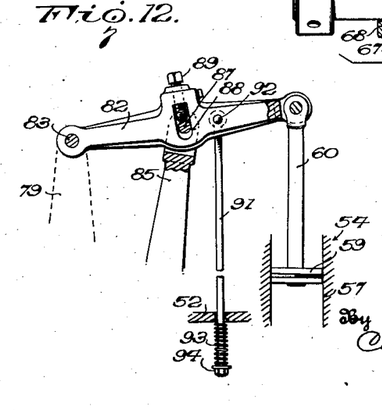
Figs. 12 and 13 are details of parts of the mechanisms of Fig. 11.

Preferably all of the valve plugs 63 are rotated and all of the pistons 59 are reciprocated by a single source of power in suitable time relation. Referring particularly to Figs. 3 and 11, this source of power may comprise an electric motor 71 mounted on a shelf 72 supported by the table legs 53. A worm 73 on the motor shaft meshes with a worm wheel 74 on a shaft 75 which is rotatably mounted in brackets 76 supported on the shelf 72. The shaft 75 constitutes a single operating shaft for all of the pumping means and as shown, is provided with a plurality of sprocket wheels 77 each of which is adapted to operate a pumping unit which as above described includes two cylinders. Only the egg pumping unit is shown in Fig. 11, and this unit is operated from a shaft 78 rotatably mounted in brackets 79 secured to the table 52 and provided with a sprocket wheel 80 which is driven from one of the sprocket wheels 77 by suitable means such as a chain 81. The pump pistons are operated from shaft 78 by suitable means which preferably may be adjusted to regulate the stroke of the pistons. As shown, the piston rods 60 are pivoted at their outer ends to operating levers 82 which operating levers are pivotally mounted at their other ends on a rod 83 supported in brackets 79, said levers being separated by suitable spacing means 84. The levers 82 intermediate their ends are connected to operating rods 85 which are driven by suitable eccentrics 86 mounted on the shaft 78, it being understood that eccentrics 86 are suitably arranged on said shaft so that the piston rods 60 move in opposite directions.

Preferably the connections between the rods 85 and levers 82 are adjustable to regulate the pump strokes. As shown particularly in Fig. 12, each operating rod 85 is forked or bifurcated at its upper end and provided with a pin 87 which extends through a slot 88 in the associated operating lever 82. Suitable means such as a set screw 89 may be provided for adjusting the length of slot 88, and it will be seen that by adjusting set screws 89 the extent of movement which is imparted to the operating levers 82 by the eccentric rods 85 may be varied with consequent variation of the extent of the suction strokes of pistons 59. Preferably pins 87 and set screws 89 are maintained in contact by suitable resilient means, and as shown, a rod 91 is suitably connected at 92 to each of the operating levers 82, said rods extending downwardly through suitable openings in the table 52 and being provided beneath said table with suitable coil springs 93 interposed between said table and nuts 94 on the ends of rods 91. In this way, the operating levers 82 and their pistons are resiliently urged downwardly in opposition to the upward movement of eccentric rods 85.

The valve plugs 63 are likewise rotated from shaft 78, preferably by suitable cam mechanism, in properly timed relation with the movement of their respective pistons. As shown in Figs. 11 and 13, the ends of said valve plugs which extend outwardly of the valve casings 62 are each provided with a rock arm 95 which is pivotally connected at 96 with an operating link 97 which link is in turn pivotally connected at 98 with one arm 99 of a two-armed lever pivoted at 100 on a bracket 79. The other arm 101 of said two-armed lever is provided at its end with a suitable roller 102 which engages in a cam groove 103 of a cam member 104 secured to the shaft 78. As the shaft 78 rotates, each of the two-armed levers is rocked about its pivot 100 and this rocking movement is transmitted through the links 97 and rock arms 95 to the valve plugs 63 to rock the latter between the positions shown in Figs. 7 and 8 in properly timed relation with the movement of the pistons 59.

It will be understood that the oil pumps 55 and the vinegar pumps 56 may be the same as the egg pumping unit above described and driven from the common operating shaft 75 in the same way. Fig. 18, however, shows a somewhat modified cam mechanism for operating the links 97 from shaft 78 which mechanism may be employed in place of that described above and is shown in Fig. 2 applied to the vinegar pumps 56. Referring to Fig. 18, the links 97 may be actuated by means of levers 105 each of which is pivoted at 106 on one of the brackets 79 and is provided intermidate its ends with a roller 107 engaging a suitable cam 108. Preferably a second lever 109, pivoted to bracket 79 at 110, is provided with a roller 111 which engages cam 108 at a point diametrically opposite the roller 107, said levers 109 being connected to levers 105 by suitable links 112.

Figure 2:
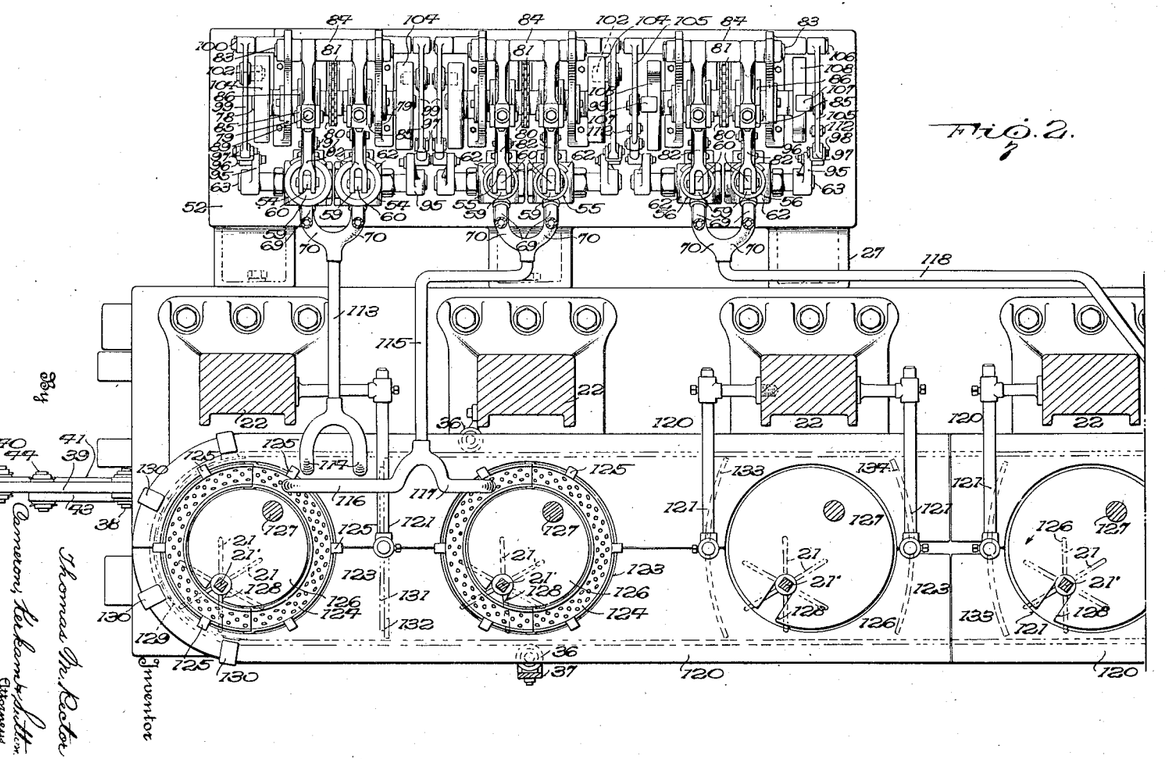
Figs. 2 and 2a constitute a top plan view of the apparatus shown in Fig. 1, with parts removed for the sake of clearness.

As clearly shown in Fig. 2, the mixture of starting materials discharged from the discharge pipes 70 of pumps 54 is conducted through a feed pipe 113 to the trough 20 adjacent its inlet end, said pipe 113 being if desired branched at 114 to provide two points of discharge into the trough. Similarly the oil discharged from discharge pipes 70 of pumps 55 is conducted by a feed pipe 115 to the inlet end of the trough 20, said pipe 115 being preferably branched and the two branches 116 and 117 delivering the oil respectively adjacent the first and second beaters. The vinegar discharged from discharge pipes 70 of pumps 56 is similarly conducted by a feed pipe 118 to a point adjacent the fifth beater, said pipe being branched at 119 to provide two points of discharge.

Figures 2A, 9, 10:
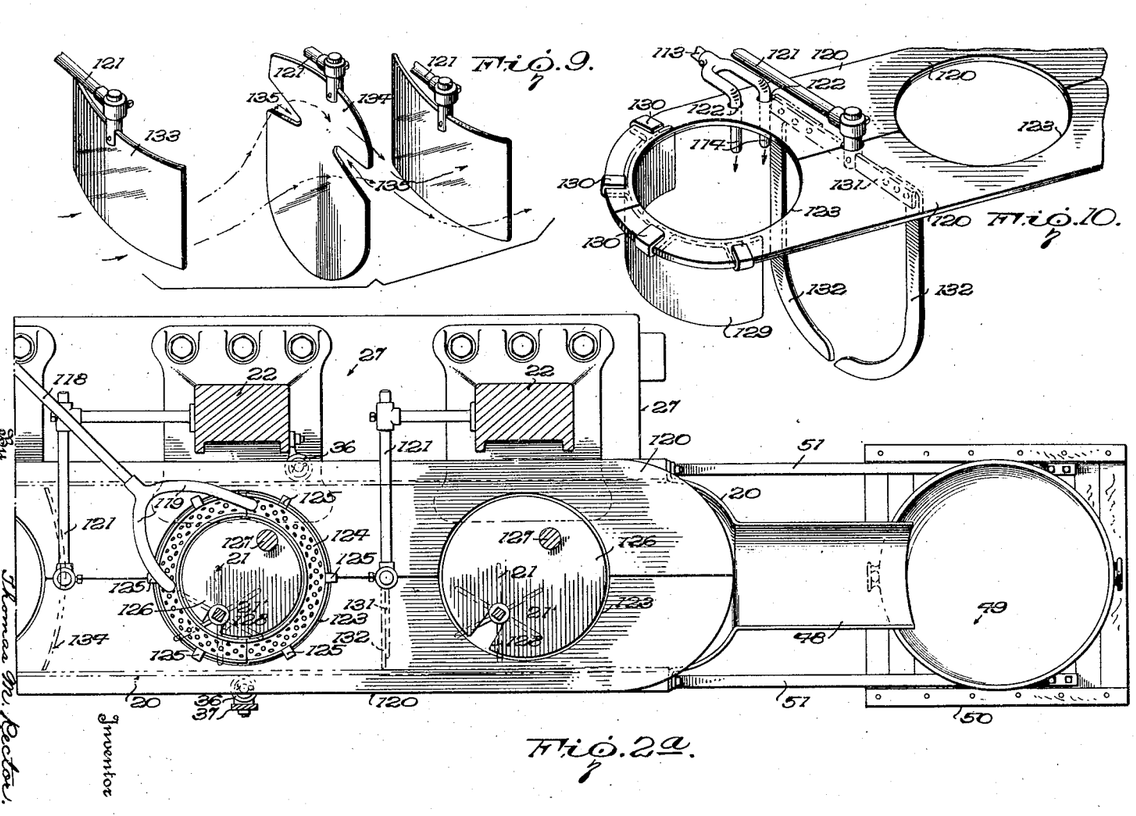
Fig. 9 is a detail of means for controlling the path of the materials through the receptacle.
Fig. 10 is a detail of one end of the receptacle cover.

For sanitary purposes and to prevent splashing from the trough 20, a suitable cover is preferably provided for the trough. As shown in Figs. 2 and 2a, and in detail in Fig. 5, said cover may comprise a plurality of sections 120 of suitable material such as sheet metal which are supported above the trough in any suitable manner and are provided with suitable openings where necessary for the passage of the beater shafts, feed pipes, etc. Preferably said cover sections are supported by a plurality of arms 121 which as shown are secured to the standards 22 and extend over the trough and downwardly through suitable openings in the cover sections, said arms 121 being provided with suitable members (see Figs. 9 and 10) which support the cover sections and also serve as hereinafter described to scrape the sides of the trough and to guide and control the course of travel of the materials along the trough. The cover sections 120 are suitably shaped so that they may be placed in position or removed from position without interfering with the beaters, scrapers and guides, and other elements.

Figure 4:
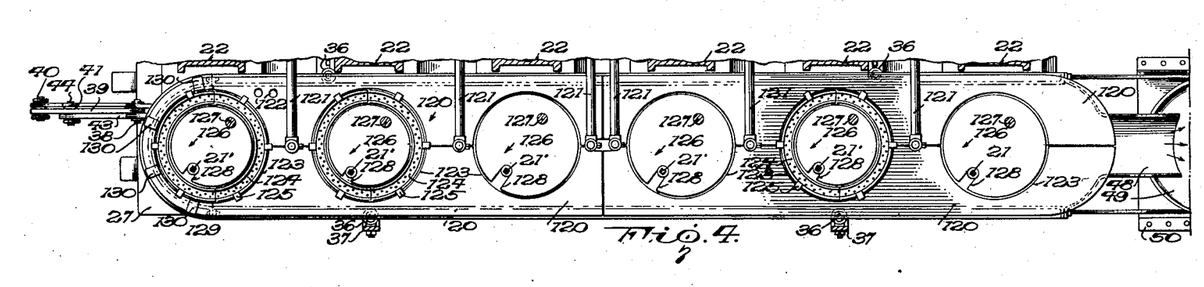
Fig. 4 is a plan view of the receptacle or container with its cover in place.
Figure 5:
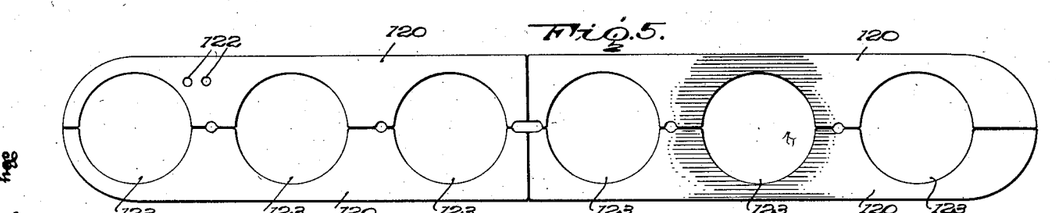
Fig. 5 is a detail of the receptacle cover.

The branches 114 of the egg delivery pipe 113 extend downwardly through one of the cover sections 120 through suitable openings 122, as seen in Figs. 4 and 5. The branches 116 and 117 of the oil delivery pipe 115 may extend through the cover in similar fashion but preferably discharge into distributing means which distribute the oil around each of the first two beaters 21. In the form shown the beaters 21 extend through the large openings 123 of the cover sections which are of sufficient extent to permit the planetary movement of the beaters, and the oil distributing means comprise annular troughs 124 which may be made in sections and supported from the cover 120 by suitable tabs 125, these troughs extending around the peripheries of openings 123 and surrounding the paths of revolution of the beater shafts 21' so that the oil is distributed over relatively large areas and is always mixed with the materials in the trough directly in the path of the revolving and rotating beaters 21.

Means are preferably provided for covering the openings left in the cover 120 through which the beater shafts extend. To this end circular plates 126 may be employed, which plates are carried on downwardly projecting posts 127 (Figs. 1 and 2) and are freely rotatable thereon, said plates 126 being provided with slots 128 through which the shafts 21' of beaters 21 extend. Where the annular troughs 124 are employed, the diameter of plates 126 is substantially equal to the inner diameter of troughs 124, and where said annular troughs 124 are not employed the diameter of plates 126 may be substantially equal to the diameter of openings 123 in the cover 120. The posts 127 and the beater shafts 21' revolve together about a common axis which is coaxial with plates 126, so that said plates are caused to rotate on their own axes, and at the same time beater shafts 21' rotate freely in the openings 128 on their own axes. Suitable means may also be provided for preventing splashing from the end of the trough when it is moved to the left from the position shown in the drawings, and to this end a splash guard 129 extends downwardly from the cover 120, said splash guard being secured to said cover in any suitable manner as by clamps 130 and being curved to conform with the curved end of the trough 20.

Suitable means are provided for scraping the sides of trough 20 as it reciprocates in order to make sure that all of the materials are thoroughly mixed and beaten, and preferably the course of travel of the materials is controlled or guided by suitable means in the second zone to provide better circulation and mixing of the materials. The scrapers, as shown between the first and second beaters and between the fifth and sixth beaters (Fig. 6), are preferably of the form shown in detail in Fig. 10 wherein a cross bar 131 is secured to the supporting arm 121 and as explained above constitutes a cover support. Secured to the cross bar 131 are downwardly extending scraping arms 132 that are curved to conform with the cross sectional shape of the trough 20. Scrapers 132 are stationary, and as the trough 20 reciprocates, these scrapers continuously wipe the sides and bottom of the trough clean of all adhering material.

Figure 6:
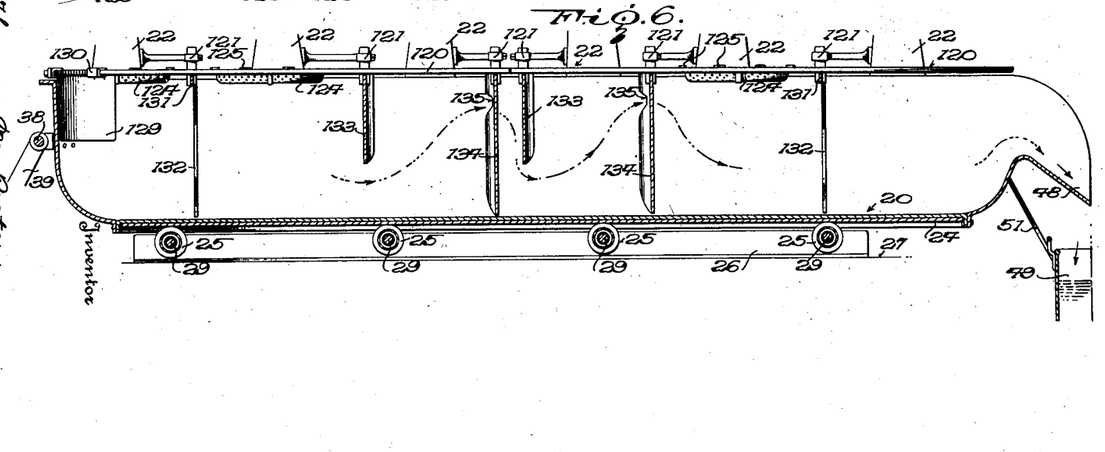
Fig. 6 is a diagrammatic side elevation of the receptacle.

In the intermediate beating or whipping zone, the scrapers are preferably of the form shown in Figs. 6 and 9 and not only scrape the sides of the trough but provide for an up and down movement of the materials as they travel along the trough. As shown in Fig. 9, the supports 121 between the second and third beaters and between the third and fourth beaters carry downwardly extending somewhat curved plates 133 which serve both as scrapers for the sides of the trough and as supports for the cover 120 but which as clearly shown in Fig. 6 do not extend to the bottom of the trough. Between the third and fourth beaters, and the fourth and fifth beaters, the supports 121 carry plates 134 which extend downwardly to the bottom of the trough and which not only support the cover 120 but also scrape both the sides and the bottom of the trough. Adjacent their upper portions, however, said plates 134 are provided with openings 135 providing a passage for the materials. Each pair of plates 133 and 134 encloses one of the beaters 21, as seen in Figs. 1 and 1a. As the trough 20 reciprocates and moves to the left as viewed in Fig. 6, the materials in the intermediate beating or whipping zone cannot be carried freely to the left with the trough because of plates 133 and 134 which are stationary. The beaters 21 between said plates, however, build up a slight pressure of the materials sufficient to force them through the openings 135, after which they cannot pass to the left of plates 134. The result of this operation is that in the intermediate zone, the materials cannot move freely with the trough but a slow movement of the materials is established under the first plate 133, upwardly and through the openings 135 in the first plate 134, downwardly under the second plate 133, upwardly through the openings 135 in the second plate 134, and into the third zone of dilution and beating. The up and down travel of the materials, together with the planetary movement of the beaters, results in very thorough mixing and beating of the materials in the intermediate zone of the trough.

The operation of the apparatus will be understood from the above description and may be summarized briefly as follows. Assuming the pumping units to be in operation, a continuous supply of the egg starting mixtures is fed to the inlet end or initial emulsifying zone of the trough. At the same time, oil is likewise fed to the trough at a regulated rate, being distributed by means of the annular troughs 124 around the beaters and substantially over the initial zone of the trough. At the same time the trough is reciprocated by the mechanism described, this movement being relatively quite slow. In the first zone, therefore, the starting mixture and the oil are thoroughly mixed and beaten, the entire area of the first zone being covered by the beaters and the sides of the trough being scraped by scrapers 132, so that the materials are initially emulsified. The movement of the trough relative to the beaters and scrapers tends to cause the materials to progress slowly from left to right as viewed in Fig. 6, and during this slow movement the emulsion is gradually built up by the addition of more oil adjacent the second beater.

The initially emulsified materials gradually move on and through the second zone, this movement being caused by the relative reciprocation of the trough relative to the beaters and plates 133 and 134. In this zone the materials not only move longitudinally of the trough past the beaters but also move up and down in the trough due to the plates 133 and 134, and are mixed from side to side of the trough by the planetary movement of the beaters. Accordingly in the second or intermediate zone all of the materials are thoroughly mixed and beaten or whipped to provide a thick stable emulsion.

The materials passing through the openings in the second plate 134 are prevented by said plate from returning toward the inlet end of the trough and due to the movement of the trough relative to the fifth and sixth beaters are caused to move slowly through the third zone and finally to discharge from the spout 48. In this third zone, the emulsion is diluted to the desired consistency by vinegar which is thoroughly mixed in and beaten up with the emulsion around the fifth beater, and is further beaten or whipped around the sixth beater.

It will be seen that the method as described above is continuous and substantially automatic in that all of the materials are fed continuously and at predetermined regulated rates to the apparatus and the finished emulsion is continuously delivered therefrom. This method avoids substantially all of the disadvantages incident to the preparation of salad dressing or the like by the batch method, such as loss of time, reduced production, high labor costs, etc., and produces economically and in larger quantities a product that is strictly uniform in character and of high quality. Moreover, the apparatus required is relatively simple, rugged and durable and requires very little care and attention. The entire apparatus is substantially self-operating and the personal equation practically eliminated since the various feeds may be regulated and fixed with scientific accuracy and once predetermined and fixed require little or no attention. Slight supervision by a single attendant is all that is required, and highly trained and skilled operators are unnecessary. As compared with methods and apparatus heretofore employed, the invention effects important manufacturing economies because production is increased and labor costs greatly reduced, and equipment costs per unit production are also decreased.

It is to be expressly understood that the term acid preserving and flavoring ingredient as used in the specification and claims is not limited to vinegar, and the term mayonnaise or mayonnaise emulsion is intended to include all such products as are made by emulsifying oil with egg yolk. It also is to be expressly understood that the method herein disclosed is not limited to the manufacture of salad dressing nor is the particular apparatus described necessary to the practice of the method. Any suitable apparatus may be employed. Reference is therefore to be had to the appended claims for a definition of the limits of the invention.

What is claimed is:

1. The method of manufacturing a mayonnaise emulsion which consists in first diluting egg yolk with a medium which does not decrease the elasticity of the emulsifying agent of the egg yolk, of next adding oil and whipping the mixture until an emulsion is formed, and of last adding those constituents which would decrease the elasticity of the emulsifying agent of the egg yolk if added before or during the formation of the emulsion.

2. The method of manufacturing a mayonnaise emulsion which consists in first diluting egg yolk with a medium which does not decrease the mobility of the egg yolk, of next adding oil and whipping the mixture until an emulsion is formed, and last of adding such constituents as would decrease the mobility of the egg yolk if added during the formative stage of emulsification.

3. The method of manufacturing a mayonnaise emulsion which consists in first diluting egg yolk with water alone to form a flowable mixture, of then adding oil and whipping the mixture to form an emulsion, and of last adding those constituents which would decrease the emulsifying power and mobility of the egg yolk if added before or during the formation of the emulsion.

4. The method of manufacturing a mayonnaise emulsion which consists in first diluting egg yolk with a substance which does not decrease the mobility of the egg yolk, of next adding oil and whipping the mixture until the emulsion is formed, and last of adding the acid preserving and flavoring ingredient after the emulsion has been formed.

5. The method of manufacturing a mayonnaise emulsion which consists in first diluting egg yolk with water alone to form a flowable mixture, of next adding oil and whipping the mixture until an emulsion is formed, and last of adding the acid preserving and flavoring ingredient after the emulsion has been formed.

6. The method of manufacturing a mayonnaise emulsion which consists in first diluting egg yolk with a substance which does not decrease the mobility of the egg yolk, of next adding oil and whipping the mixture until the emulsion is formed, and last of adding vinegar after the emulsion has been formed.

7. The method of manufacturing a mayonnaise emulsion which consists in first diluting egg yolk with water alone to form a flowable mixture, of next adding the oil and whipping the mixture until an emulsion is formed, and last of adding vinegar after the emulsion has been formed.

8. The method of manufacturing a mayonnaise emulsion which consists in first mixing spices, egg yolk and water only to form a flowable mixture, of next adding the oil and whipping the mixture until an emulsion has been formed, and last of adding the acid preserving and flavoring ingredients after the emulsion has been formed.

9. The method of manufacturing a mayonnaise emulsion which consists in first mixing spices, egg yolk and water only to form a flowable mixture, of next adding oil and whipping the mixture until an emulsion is formed, and last of adding vinegar after the emulsion has been formed.

10. A continuous process of preparing a thick stable mayonnaise which consists in continuously feeding a flowable starting mixture of egg yolk and water only to a beating zone, feeding said starting mixture, gradually through said zone while continuously adding oil to complete the emulsion at a plurality of points in said zone and at rates in predetermined proportion to the rate of feed of said starting mixture, and continuously emulsifying said ingredients during their travel through said zone.

11. A continuous process of preparing salad dressing which consists in continuously feeding a flowable starting mixture of egg, water and spices only to a beating zone, progressing said ingredients through said zone while continuously beating the same, and adding a vegetable oil to build up the emulsion at a plurality of stages in the progress of said ingredients through said zone.

12. A continuous method of making mayonnaise, which consists in feeding a flowable mixture of egg and water only to start the emulsion to a beating zone, progressing said mixture gradually through said zone while continuously beating the same, progressively adding ingredients to complete the emulsion at predetermined rates at a plurality of points in said zone, and delivering the finished emulsion from said zone.

13. A continuous process of preparing salad dressing which consists in continuously feeding a flowable starting mixture of egg, water and spices only at a predetermined rate to a beating zone, progressing said mixture through said zone while continuously beating the same, and adding ingredients to build up the emulsion at a plurality of stages in the emulsification of said mixture and at individually predetermined rates.

14. A continuous process of preparing salad dressing which consists in first mixing egg yolk and a medium which does not decrease the elasticity of the emulsifying agent of the egg yolk to form a flowable starting mixture, then continuously feeding said starting mixture and an emulsion building ingredient at predetermined rates to a beating and emulsifying zone, progressing said mixture and ingredient through said emulsifying zone and then through a beating zone and a diluting zone, continuously feeding a diluent to said diluting zone, and beating said materials continuously throughout their travel through said zones.

15. A continuous process of making mayonnaise which consists in maintaining successive zones of emulsification, beating, and dilution, feeding oil and a flowable mixture of egg yolk and water only, with or without spices, at predetermined rates to said zone of emulsification, causing said materials to travel through said three zones while continuously beating the same, and feeding a diluent to said diluting zone at a predetermined rate.

16. A continuous process of making mayonnaise which consists in maintaining successive zones of emulsification, beating, and dilution, feeding a starting mixture including egg yolk, water and spices only to said zone of emulsification, feeding a supply of vegetable oil to and distributing said oil over said zone of emulsification, feeding a diluent to said diluting zone, and establishing and maintaining a movement of said materials through said three zones in succession while continuously beating said materials.

17. The method of making mayonnaise which consists in preparing a flowable mixture containing only egg yolk, spices and a medium which does not decrease the elasticity of the emulsifying agent of the egg yolk, feeding said flowable mixture and a vegetable oil to an emulsifying apparatus to form a thick stable emulsion, and diluting said emulsion with vinegar.

18. A continuous process of making mayonnaise which consists in preparing a flowable mixture containing only egg yolk, spices and a diluent which does not decrease the elasticity of the emulsifying agent of the egg yolk, continuously feeding said flowable mixture and a vegetable oil at predetermined rates to an emulsifying apparatus to form a thick stable emulsion, and continuously diluting said emulsion with vinegar.

19. The method of making mayonnaise which consists in preparing a flowable mixture containing only egg yolk, spices and water, continuously feeding said mixture and a vegetable oil at predetermined rates to an emulsifying apparatus to form a thick stable emulsion, and continuously diluting the pre-formed emulsion with vinegar.

THOMAS M. RECTOR.